Nov. 14, 1961 H. J. TISCHLER ET AL 3,008,765
RECLINING SEAT FOR TWO-DOOR AUTOMOBILES
Filed Aug. 24, 1959 3 Sheets-Sheet 1
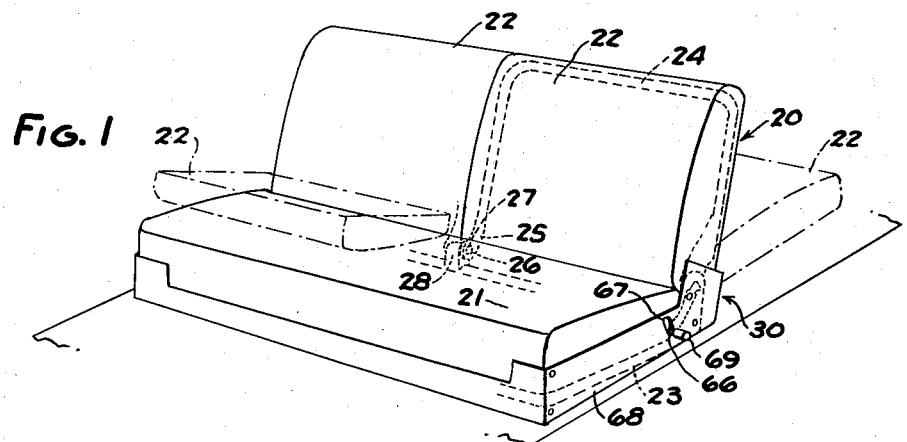
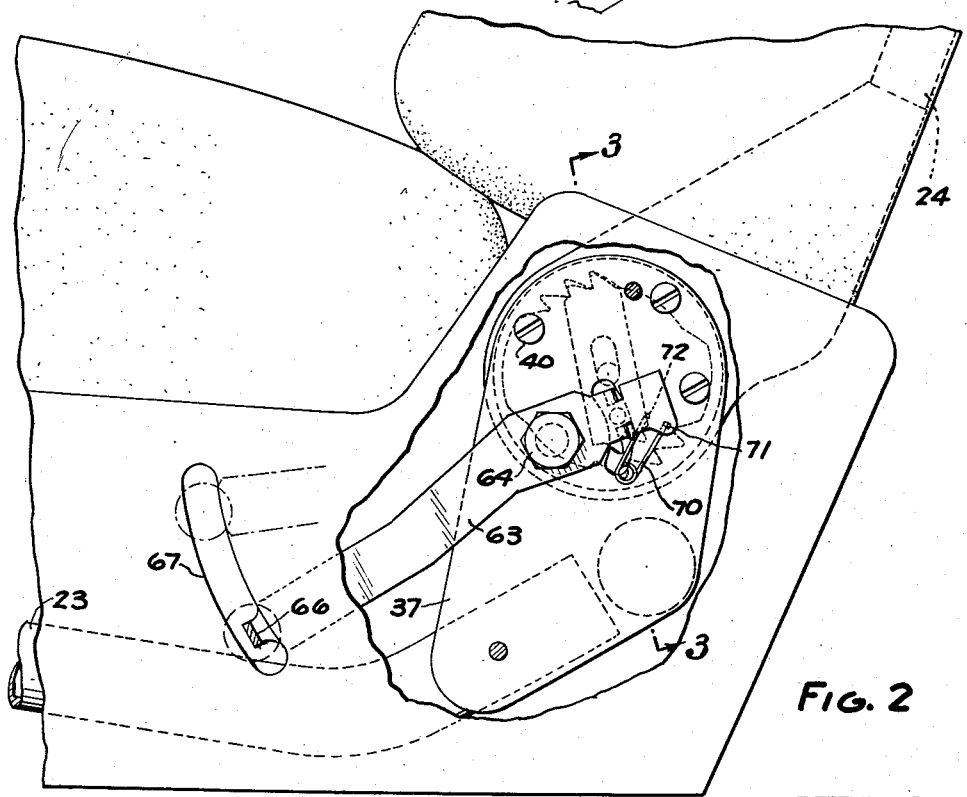
INVENTORS
HENRY J. TISCHLER & ANTHONY CIESIELSKI
BY
*Barnes, Kisselle, Raisch & Choate*
ATTORNEYS Nov. 14, 1961   H. J. TISCHLER ET AL   3,008,765
RECLINING SEAT FOR TWO-DOOR AUTOMOBILES
Filed Aug. 24, 1959   3 Sheets-Sheet 2

INVENTORS
HENRY J. TISCHLER & ANTHONY CIESIELSKI
BY
Barnes, Kisselle, Raisch & Choate
ATTORNEYS

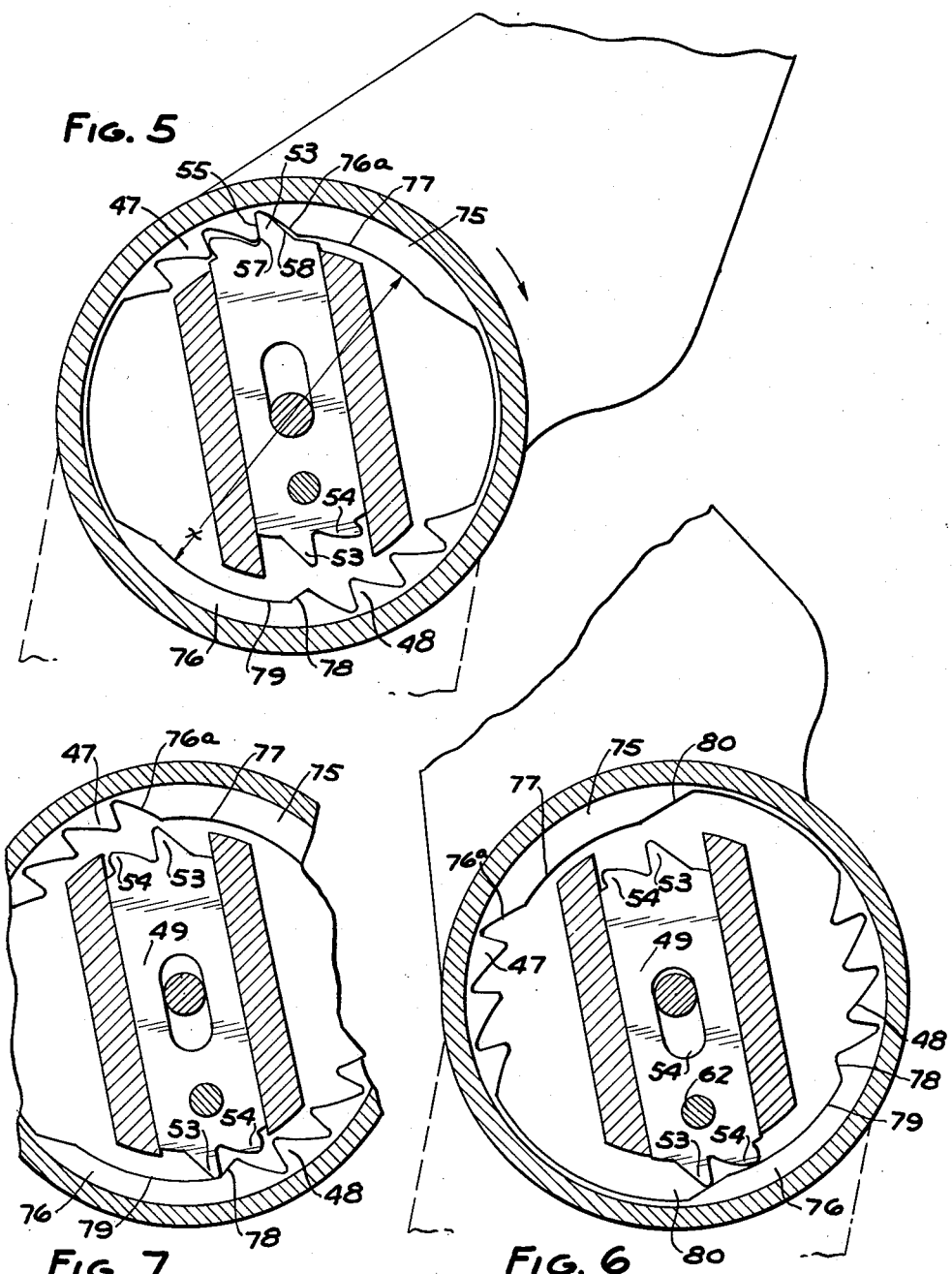

:::

United States Patent Office 3,008,765
Patented Nov. 14, 1961

3,008,765
RECLINING SEAT FOR TWO-DOOR AUTOMOBILES
Henry J. Tischler, Huntington Woods, and Anthony Ciesielski, Detroit, Mich., assignors to Young Spring & Wire Corporation, Detroit, Mich., a corporation of Michigan
Filed Aug. 24, 1959, Ser. No. 835,650
12 Claims. (Cl. 297—367)

This invention relates to seats for automobiles and particularly to reclining seats for two-door automobiles.

In our copending application titled Reclining Seat, Serial No. 682,114, filed September 5, 1957, now Patent No. 2,941,583, granted June 21, 1960, there is disclosed and claimed a reclining seat having a novel adjusting mechanism for raising and lowering movement of the seat back in an automobile seat, and this application is a continuation-in-part of the aforementioned application.

It is an object of this invention to provide an adjustable reclining seat which is particularly designed for use in a two-door automobile. The adjusting mechanism is designed so that the seat back may not only be reclined rearwardly but in addition the seat may be folded forwardly to permit passengers to enter and leave the rear passenger seat.

In the drawings:

FIG. 1 is a perspective view of a reclining seat embodying the invention.

FIG. 2 is a fragmentary view on an enlarged scale of one end of the seat shown in FIG. 1, parts being broken away.

FIG. 5 is a fragmentary sectional view similar to FIG. 4 but showing the seat back in a raised position.

FIG. 6 is a fragmentary sectional view similar to FIG. 5 showinng the seat back in a forwardly folded position.

FIG. 7 is a fragmentary sectional view similar to FIG. 6 showing the relative position of the parts as the seat back is moved to its upright position from the forwardly folded position.

Figure 3:
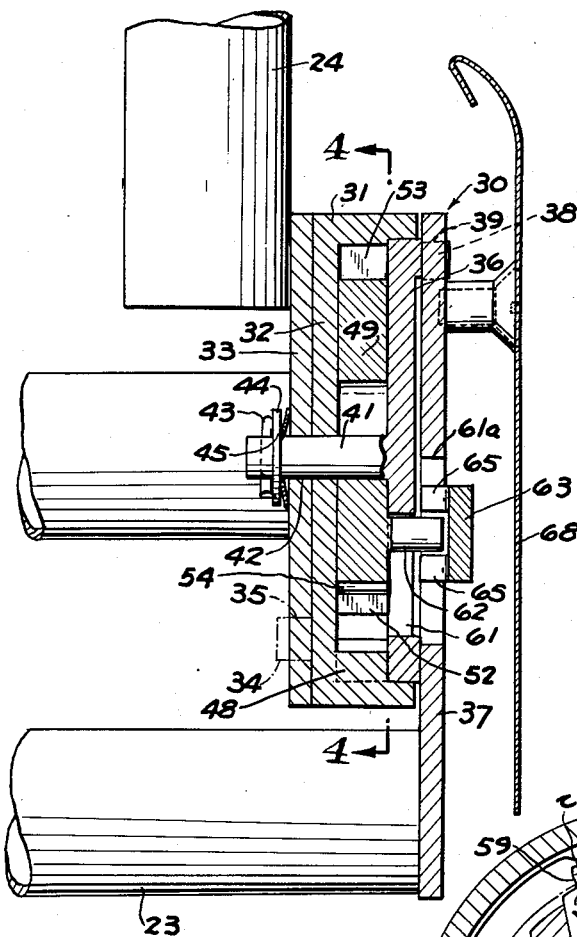
FIG. 3 is a fragmentary sectional view taken along the line 3—3 in FIG. 2.

Referring to FIG. 1, a seat 20 represents a front seat of an automobile which includes a seat cushion 21 and a back cushion comprising two sections 22 mounted for hinging movement relative to the seat cushion 21. As shown in FIG. 2 the frame for the reclining seat is made of tubular members and includes a seat frame 23 for supporting the seat cushion and generally U-shaped back frames 24 for supporting the back cushions.

Each back frame 24 includes a bracket 25 at the lower end of the inner side thereof having a generally horizontal pin 26 thereon which projects into an opening on an upright 28 extending upwardly from the frame 23 (FIG. 1). By this arrangement, the inner side of each back frame 24 is hinged at its lower edge to the seat frame 23. The outer side of each frame 24 is hinged at its lower edge to the seat frame by an adjusting mechanism 30.

As shown in the drawings, adjusting mechanism 30 includes a cylindrical casing 31 having an end wall 32 non-rotatably mounted on a flat upright bracket 33 on the back frame 24 by means of lugs 34 projecting through openings 35 in bracket 33. The inner periphery of cylindrical casing 31 bears against the periphery of a circular bearing plate 36 to form the pivot for the back frame 24 to the seat frame 23. Bearing plate 36 is fixed to a flat upright bracket 37 by means which include circumferentially spaced projections 38 passing through openings 39 in bracket 37 and screws 40 threaded into projections 38 (FIG. 2). Bracket 37 is fixed on frame 23.

As shown in FIG. 3, bearing plate 36 includes a centrally located pin 41 which extends axially through the center of wall 32 of cylindrical casing 31 and through an opening 42 in bracket 33. Bearing plate 36 and cylindrical casing 31 are held in assembled relation by a cotter pin 43 extending through the end of pin 41 to hold a flat washer 44 against the spring washer 45 which, in turn, is compressed against the outer surface of bracket 33.

Figure 4:
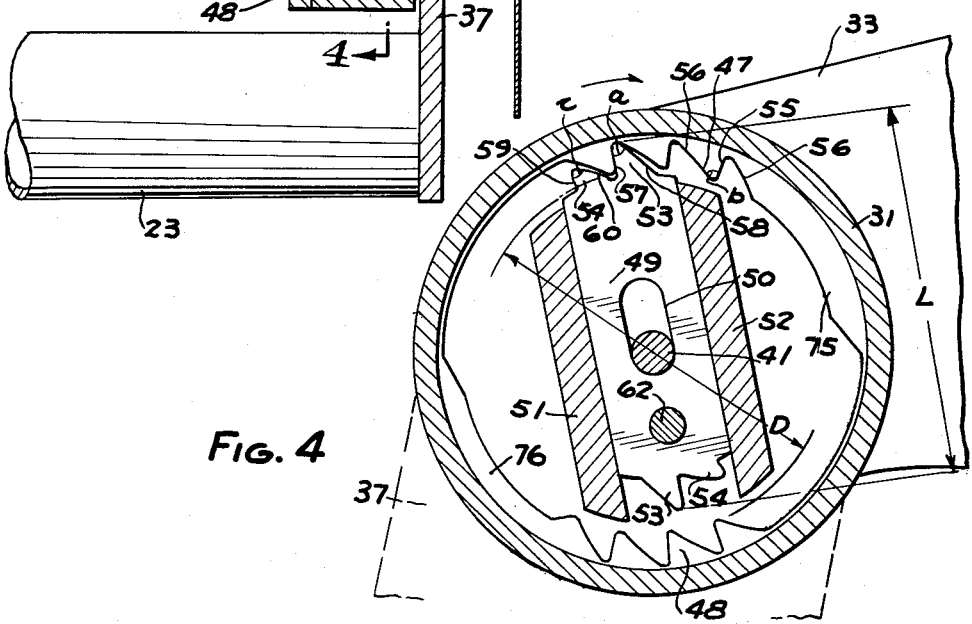
FIG. 4 is a fragmentary sectional view on an enlarged scale taken along the line 4—4 in FIG. 3, but showing the seat back in a rear position.

Referring to FIG. 4, cylindrical casing 31 is formed on the portion of its inner periphery lying axially inwardly of plate 36 with two diametrically opposed sets of teeth 47, 48 which lie on opposite sides of pin 41. The apexes of teeth 47, 48 lie on a common circle having a diameter D. The apexes of teeth 47 are staggered slightly circumferentially relative to the apexes of teeth 48. A pawl 49 is positioned within cylindrical casing 31 for reciprocating movement between the sets of teeth 47, 48. Pawl 49 includes an opening 50 surrounding pin 41 and elongated in the direction of movement of pawl 49. Pawl 49 is guided in its reciprocating movement by spaced rails 51, 52 which are formed integrally with bearing plate 36 and engage the side edges of pawl 49. Pawl 49 is formed on each end thereof with a locking tooth 53 and an auxiliary tooth 54.

As further shown in FIG. 4, the length L of pawl 49 measured in a direction parallel to the line of reciprocating movement of pawl 49 is greater than the diameter D of the circle in which the apexes of the sets of teeth 47, 48 lie. By this construction when the pawl 49 is moved away from one set of teeth and toward the other set of teeth, one of the teeth 53 is in position for engagement with the teeth toward which the pawl is moved before the opposite tooth 53 moves out of engagement with the teeth away from which the pawl is moving. When pawl 49 is reciprocated a step-by-step adjustment of the back frame relative to the seat frame is insured because of the length of the pawl and the slightly staggered relation of teeth 47, 48.

As shown in FIG. 4, each tooth 47 has a generally flat radial surface 55 and an inclined concave surface 56. The teeth 48 of the opposite set are similarly shaped. Each tooth 53 of the pawl 49 includes a complementary flat radial surface 57 and an inclined flat surface 58. The included angle $a$ which the radial surface 57 makes with the inclined surface 58 of the pawl is smaller than the included angle $b$ which the radial surface 55 makes with the inclined surface 56 of the set of teeth 47. Tooth 54 of pawl 49 is shorter than tooth 53 and includes a generally radial convex surface 59 and an inclined convex surface 60, the included angle $c$ between surfaces 59 and 60 being greater than the included angle $b$ or the included angle $a$. The convex surface 59 of tooth 54 is inclined slightly, at an angle of about 5°, from a radial plane and in the direction toward the adjacent tooth 53 (FIG. 4) to facilitate engagement and disengagement of the pawl 49 with the sets of teeth 47, 48.

As shown in FIG. 4, the camming surfaces 56 of the diametrically opposed sets of teeth incline radially outwardly and circumferentially in a direction opposite to the direction in which the back frame 24 moves from the upright to the several reclining positions. As pointed out previously and shown in FIG. 4 the teeth 47 are displaced angularly or circumferentially relative to the teeth 48 so that when the pawl is moved out of engagement with one set of teeth and into engagement with the other set of teeth the casing 31 will move angularly under the weight of the back frame 24 to a new position. For example, when the pawl 49 is moved upwardly the upper tooth 53 of the pawl is moved into a space between a pair of teeth 47 and when the lower tooth 53 of the pawl disengages from the tooth 48, casing 32 together with back frame 24 will rotate in the direction of the arrow to bring radial surface 57 of the upper tooth 53 into contact with radial surface 55 of one of the teeth 47. In the uppermost position of the seat back (FIG. 5), and the succeeding three reclining adjusted positions, one of the teeth 54 on the pawl contacts the radial surface of the adjacent tooth 47 or 48 on the casing, thus distributing the load on two teeth instead of one. In the fifth adjusted position of the seat back (FIG. 4) only a tooth 53 is engaged with a tooth 47 and in the sixth position of the seat back only a tooth 53 is engaged with a tooth 48.

Means are provided for manually reciprocating the pawl 49 and include slots 61, 61a through bearing plate 36 and bracket 37, respectively, through which a pin 62 on pawl 49 projects. As shown in FIGS. 2 and 3, a lever 63 is pivoted to upright bracket 37 on the seat frame by means of a bolt 64. Lugs 65 bent inwardly from one end of the lever are adapted to engage the pin 62 on pawl 49 so that when the lever is actuated the pin 62 is moved upwardly and downwardly as shown in FIG. 2 to reciprocate the pawl 49. The other end of lever 63 is bent outwardly as at 66 through an opening 67 in protective cover 68. A knob 69 is mounted on the end of the lever to provide a means for grasping the lever 63 in order to move it. A hairpin spring 70 is provided to yieldingly urge the pawl into engagement with each of the sets of teeth. Spring 70 comprises a loop of wire with projecting arms, one arm being engaged with the end of the lever 63 as at 71 and the other arm being engaged with the bracket 37 as at 72. As the lever 63 is moved, the point 71 on the lever 63 is moved from one side of a center line connecting point 72 and the axis of bolt 64 to the other side so that the spring passes over center to yieldingly urge the lever in each of its positions and, in turn, yieldingly urge the pawl into engagement with each of the sets of teeth.

When the back frame 24 is in its uppermost or generally vertical position the parts of the adjusting mechanism 30 are positioned as shown in FIG. 5. Tooth 53 and tooth 54 of pawl 49 are engaged with teeth 47. When the lever 63 is actuated to move pawl 49 downwardly the lower tooth 53 of the pawl 49 moves into the space between teeth 48 and thereafter the upper tooth 53 moves out of engagement with the upper set of teeth 47 permitting the back frame 24 to move downwardly under its own weight in a clockwise direction as shown in FIG. 5 to a new position. The downward movement of the seat frame more than a predetermined amount is prevented by the contact of one of the teeth 48 with tooth 53 and tooth 54 on the lower end of the pawl. When the lever 63 is again actuated to raise the pawl another downward stepped movement of the back frame 24 is produced. Successive movements of the lever cause successive movements of the back frame until the back frame is in the fully lowered position beyond that shown in FIG. 4 with the pawl out of engagement with any of the teeth. In this position the back frame may be supported by a bracket or other support (not shown) on the floor of the automobile.

In order to elevate back frame 24 it is only necessary to grasp the back frame and move it manually upwardly. This movement will cause the pawl to be reciprocated back and forth under the action of teeth 47, 48 on the pawl. Specifically, the inclined surfaces 56 of teeth 47, 48 act on the teeth 53 to cause the reciprocation of the pawl. By this arrangement the back frame will be elevated in one continuous movement.

The above described arrangement is shown and claimed in the aforementioned application Serial No. 682,114.

In order to permit the seat backs 23 to be folded forwardly so that the passengers may enter and leave the rear passenger compartment in the vehicle, guide members 75, 76 are provided at diametrically spaced points on the interior of casing 31. Guide member 75 extends circumferentially clockwise from the last tooth 47 and includes a surface 76a which has the same configuration as surface 56 of tooth 47 and a circumferentially extending surface 77 which lies on the circle defined by the apexes of the teeth 47. The second guide member 76 is formed with a cam surface 78 which extends circumferentially counterclockwise from the apex of the last tooth 48 in the second set of teeth on the casing 31 and is inclined outwardly toward a second circumferentially extending surface 79 which is spaced radially outwardly from the apexes of the second sets of teeth 48. The distance X between the opposed surfaces 77 and 79 is substantially equal to the length of the pawl 49.

As the seat back 24 is grasped and moved forwardly in order to fold it to permit the entry or exit of a passenger from the rear compartment, surface 76a engages the tooth 53 on the upper end of pawl 49 as shown in FIG. 5 and urges the pawl downwardly out of engagement with the teeth 47. Surface 77 then engages the end of pawl 49 and urges pawl 49 over the cam surface 78 toward surface 79 (FIG. 7). Over center spring 71 acting on pawl 49 insures the engagement of pawl 49 with surface 79. As the seat is further folded forwardly to the final position shown in FIG. 6, pawl 49 may move out of contact with guide members 75, 76. However, the action of spring 71 on pawl 49 maintains pawl 49 toward one side of casing 31. When the seat back 23 is elevated by grasping it and moving it rearwardly, the teeth 53 at one end of the pawl engage one or the other of the ramp surfaces 80 at the leading ends of surfaces 77, 79 and the teeth 53 at opposite ends of the pawl ride along the surfaces 77, 79. As the tooth 53 at the lower end of the pawl reaches the trailing end of surface 79 it comes into contact with cam surface 78 which gives a sudden upward movement to pawl 49 causing it to move upwardly and in turn moves spring 71 over center so that the action of spring 71 causes pawl 49 to continue to move upwardly into engagement with first tooth 47 as shown in FIG. 7. The presence of cam surface 78 insures that the first tooth will be engaged and that the seat back will be returned to its uppermost upright position without skipping any teeth.

It can thus be seen that the seat back can be adjusted rearwardly in the usual fashion in step by step movement, can be elevated by a continuous movement and can be folded forwardly to permit the entrance and exit of passengers to the rear compartment of the vehicle.

We claim:

1. In an adjusting mechanism for a reclining seat of the type including a pair of hingedly connected frames, one of which has two sets of diametrically opposite teeth and the other has a reciprocable pawl alternately engageable with each set of said teeth to effect a progressive adjustment of the back frame about the axis of hinging movement, the improvement which comprises means forming a pair of diametrically opposed guide surfaces, each extending circumferentially adjacent one set of said teeth, one of said guide surfaces lying on a circle defined by the apexes of the adjacent set of teeth, the other guide surface lying on a circle of greater diameter than the circle defined by the crests of the set of teeth adjacent thereto, the latter guide surface being connected with the first adjacent tooth of the adjacent set of teeth by a radially inwardly inclined ramp, said guide surfaces being diametrically spaced apart a distance corresponding generally to the length of said pawl whereby when one of said frames is pivoted from a position wherein the opposite ends of the pawl align with the guide surfaces toward a position wherein the opposite ends of the pawl engage with the two sets of teeth, one end of the pawl is engaged by said ramp and the pawl is thereby cammed into engagement with one set of said teeth.

2. The combination called for in claim 1 including a spring of the overcentered type for resiliently urging said pawl into engagement with each set of said teeth.

3. In a reclining seat comprising a seat frame, a back frame, means for pivotally connecting said back frame to said seat frame, and a seat adjusting mechanism comprising diametrically opposed sets of teeth on said back frame on opposite sides of the hinge axis of said back frame to said seat frame, a pawl having portions thereof provided with teeth for engaging said diametrically opposed sets of teeth on the back frame, means for mounting said pawl on the other of said frames for reciprocating movement between said opposed sets of teeth, and means for reciprocating said pawl, the length of said pawl being such that when the pawl is reciprocated from engagement with one set of teeth toward engagement with the other set of teeth, said pawl is in position to engage said other set of teeth before it is disengaged with the first set of teeth, whereby the position of said back frame relative to said seat frame may be adjusted in step-by-step fashion by reciprocating said pawl, said back frame being adjusted by one step relative to said seat frame on each reciprocation of said pawl, the improvement which comprises a first guide member positioned adjacent one set of said teeth and providing a circumferentially extending surface lying in a circle defined by the apexes of said one set of teeth, and a second guide member diametrically opposed to said first member adjacent the second set of teeth and defining a cam surface extending to the apex of the first adjacent tooth of said second set of teeth whereby when the seat back is moved forwardly to fold the seat, the circumferentially extending surface engages said pawl and when the seat back is folded rearwardly from its forwardly folded position to the upright position the cam surface engages said pawl and urges it into engagement with one of the teeth in said first set of teeth.

4. The combination set forth in claim 3 wherein said second member includes a second circumferentially extending surface lying on an arc spaced from said first circumferential surface a distance substantially equal to the length of said pawl.

5. In a reclining seat comprising a seat frame, a back frame, means for pivotally connecting said back frame to said seat frame, and a seat adjusting mechanism comprising diametrically opposed sets of teeth on said back frame on opposite sides of the hinge axis of said back frame to said seat frame, a pawl having portions thereof provided with teeth for engaging said diametrically opposed sets of teeth on the back frame, means for mounting said pawl on the other of said frames for reciprocating movement between said opposed sets of teeth, and means for reciprocating said pawl, the length of said pawl being such that when the pawl is reciprocated from engagement with one set of teeth toward engagement with the other set of teeth, said pawl is in position to engage said other set of teeth before it is disengaged with the first set of teeth, whereby the position of said back frame relative to said seat frame may be adjusted in step-by-step fashion by reciprocating said pawl, said back frame being adjusted by one step relative to said seat frame on each reciprocation of said pawl, the improvement comprising a first guide member positioned adjacent one set of said teeth and providing a circumferentially extending surface lying on a circle defined by the apexes of said one set of teeth, a second guide member diametrically opposed to said first member adjacent the second set of teeth and having a second circumferentially extending surface spaced from the first surface on said first member a distance substantially equal to the length of said pawl, said second member having a cam surface extending from said second surface to the apex of the first tooth of said second set of teeth whereby when the seat back is moved forwardly to fold the seat the first surface engages the pawl and urges it toward the second surface and when the seat back is folded rearwardly from its forwardly folded position to the upright position the cam surface engages the pawl and urges it away from the second surface into engagement with one of the teeth in said first set of teeth.

6. In a reclining seat comprising a seat frame, a back frame, means at the inner and outer ends of said back frame for pivotally connecting said back frame to said seat frame, and an adjusting mechanism adjacent one of said ends of said back frame for adjusting the position of said back frame relative to said seat frame comprising diametrically opposed sets of teeth on said back frame on opposite sides of the pivoted axis of said back frame to said seat frame, the apexes of said teeth extending radially inwardly and lying on a common circle having the pivotal axis of the back frame to the seat frame as its center, a pawl, means for mounting said pawl on said seat frame for rectilinear movement, said pawl having a tooth at each end thereof adapted to engage the diametrically opposed sets of teeth, the length of said pawl measured along a line parallel to its reciprocating movement thereof being greater than the diameter of the circle in which the apexes of the diametrically opposed sets of teeth lie, the circumferential positions of said sets of teeth relative to the line of movement of said pawl being such that as the pawl is reciprocated and the tooth on one end of said pawl is moved out of engagement with one set of teeth the tooth on the other end of said pawl is moved into a space between the teeth in the other set of teeth, whereby the position of said back frame to said seat frame may be adjusted by reciprocating said pawl between said diametrically opposed sets of teeth, said back frame being adjusted by increments on each movement of the pawl in either direction, the improvement comprising a first guide member positioned adjacent one set of said teeth and providing a circumferentially extending surface lying on a circle defined by the apexes of said one set of teeth, and a second guide member diametrically opposed to said first member adjacent the second set of teeth and defining a cam surface extending to the apex of the first tooth of said second set of teeth whereby when the seat back is moved forwardly to fold the seat the circumferentially extending surface engages the pawl and when the seat back is folded rearwardly from its forwardly folded position to the upright position the cam surface engages the pawl and urges it into engagement with one of the teeth in said first set of teeth.

7. The combination set forth in claim 6 including a spring for yieldingly urging said pawl into engagement with each of said sets of teeth, said spring being operable to yieldingly urge the pawl into contact with one or the other of the surfaces on said guide members.

8. The combination set forth in claim 7 wherein said second guide member is provided with a second surface extending circumferentially from said cam surface, said first surface urging said pawl toward said second surface when the seat is folded forwardly.

9. The combination set forth in claim 8 including a spring for yieldingly urging the pawl into engagement with said sets of teeth.

10. In a reclining seat comprising a seat frame, a back frame, means for hinging one of said inner and outer ends of the back frame to the seat frame, and a combined hinging and adjusting mechanism at the other said end of said back frame comprising a cylindrical casing mounted on said back frame, a bearing plate mounted on said seat frame and having a portion engaging the entire periphery of said cylindrical casing thereby forming a pivotal connection for said back frame to said seat frame, diametrically opposed sets of teeth on the inner periphery of said cylindrical casing, the apexes of said teeth lying on a common circle, a pawl on said bearing plate, guide means on said bearing plate for guiding said pawl for reciprocating movement in a path generally diametrically of said cylindrical casing, at least one tooth on each end of the pawl, the length of said pawl measured along a line parallel to its line of reciprocation being greater than the diameter of the apex circle of said diametrically opposed sets of teeth, and means on said seat frame for reciprocating said pawl, the circumferential positions of said sets of teeth relative to the line of movement of said pawl being such that as the pawl is reciprocated and the tooth on one end of said pawl is moved out of engagement with one set of teeth the tooth on the other end of said pawl is moved into a space between the teeth in the other set of teeth, whereby when said pawl is reciprocated from engagement with one set of teeth into engagement with the other set of teeth the back frame is permitted to move downwardly in step-by-step fashion under its own weight to a lower position, the improvement comprising a first guide member positioned adjacent one set of said teeth and providing a circumferentially extending surface lying on a circle defined by the apexes of said one set of teeth, and a second guide member diametrically opposed to said first member adjacent the second set of teeth and defining a cam surface extending to the apex of the first tooth of said second set of teeth whereby when the seat back is moved forwardly to fold the seat the circumferentially extending surface engages the pawl and when the seat back is folded rearwardly from its forwardly folded position to the upright position the cam surface engages the pawl and urges it into engagement with one of the teeth in said first set of teeth.

11. In a reclining seat comprising a seat frame, a back frame, means for hinging one of said inner and outer ends of the back frame to the seat frame, and a combined hinging and adjusting mechanism at the other end of said back frame comprising a cylindrical casing mounted on said back frame, a bearing plate mounted on said seat frame and having a portion engaging the periphery of said cylindrical casing thereby forming a pivotal connection for said back frame to said seat frame, diametrically opposed sets of teeth on the inner periphery of said cylindrical casing, the apexes of said teeth lying on a common circle, a pawl on said bearing plate, guide means on said bearing plate for guiding said pawl for reciprocating movement in a path generally diametrically of said cylindrical casing, at least one tooth on each end of the pawl, the length of said pawl measured along a line parallel to its line of reciprocation being greater than the diameter of the apex circle of said diametrically opposed sets of teeth, and means on said seat frame for reciprocating said pawl, the circumferential positions of said sets of teeth relative to the line of movement of said pawl being such that as the pawl is reciprocated and the tooth on one end of said pawl is moved out of engagement with one set of teeth the tooth on the other end of said pawl is moved into a space between the teeth in the other set of teeth, whereby when said pawl is reciprocated from engagement with one set of teeth into engagement with the other set of teeth the back frame is permitted to move downwardly under its own weight to a lower position, each said tooth in said diametrically opposed sets of teeth comprising a radial surface and an inclined surface, said tooth on each end of said pawl comprising a generally complementary radial surface and a generally complementary inclined surface, the improvement comprising a first guide member positioned adjacent one set of said teeth and providing a circumferentially extending surface lying on a circle defined by the apexes of said one set of teeth, and a second member diametrically opposed to said first member adjacent the second set of teeth and having a second circumferentially extending surface spaced from the first surface on said first member a distance substantially equal to the height of said pawl, said second member having an inclined cam surface extending from said second surface to the apex of the first tooth of said second set of teeth whereby when the seat back is moved forwardly to fold the seat the circumferentially extending surface engages the pawl and when the seat back is folded rearwardly from its forwardly folded position to the upright position the cam surface engages the pawl and urges it away from the second surface into engagement with one of the teeth in said first set of teeth.

12. The combination set forth in claim 11 including a spring for alternately urging said pawl into engagement with said sets of teeth.

References Cited in the file of this patent
UNITED STATES PATENTS 2,336,013    Hamilton    Dec. 7, 1943
2,712,345    Borisch    July 5, 1955